Patented Mar. 17, 1942

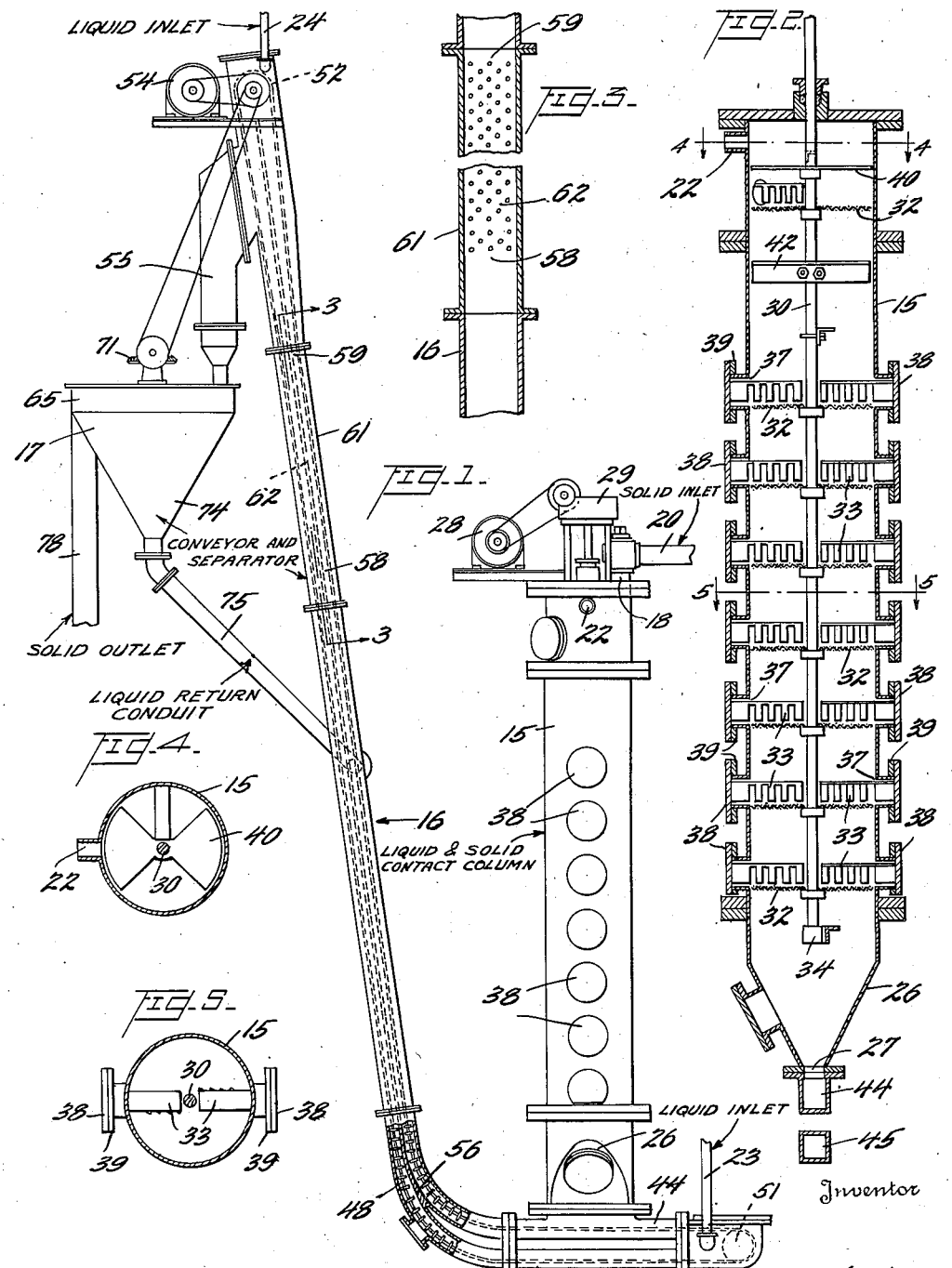

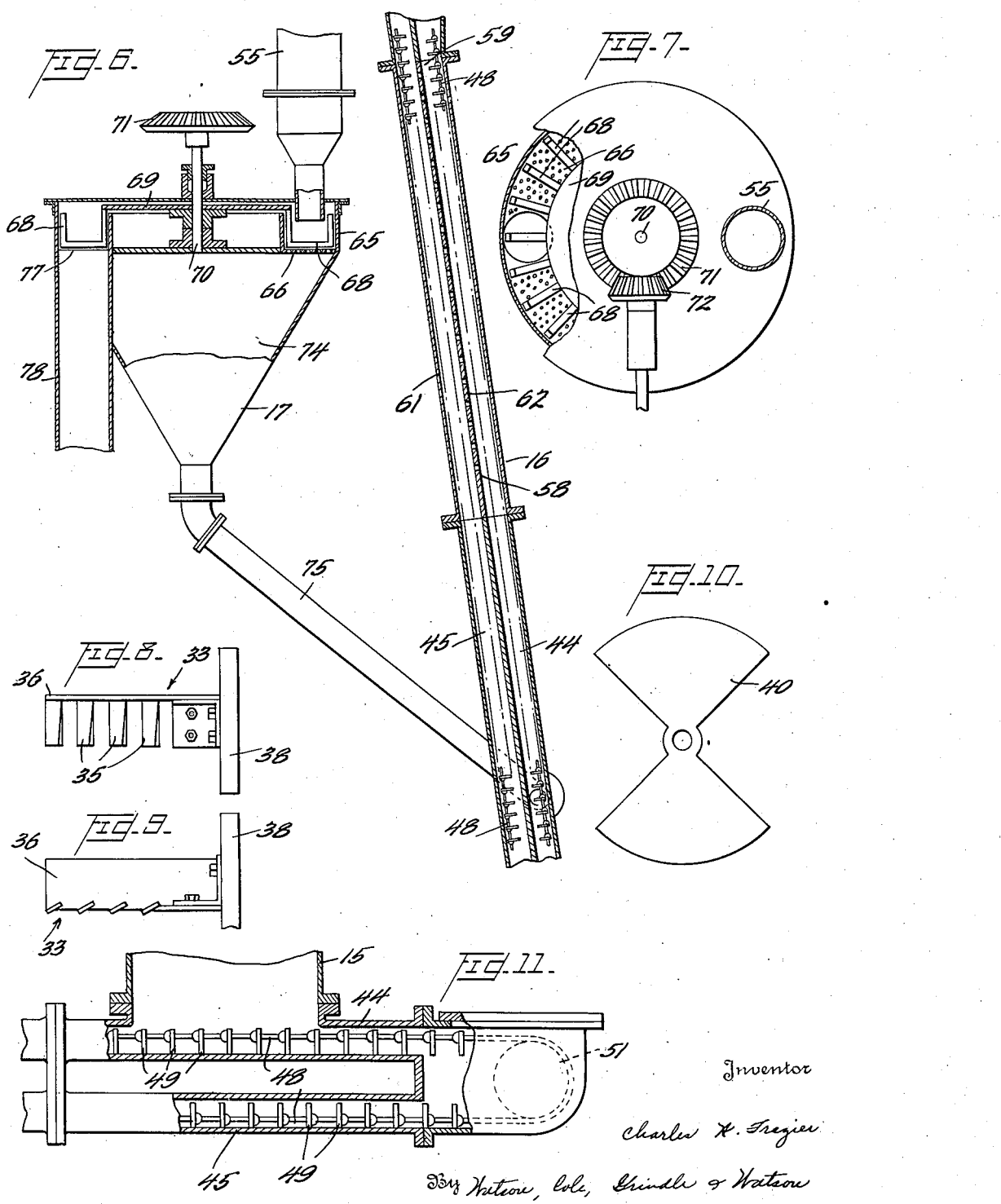

2,276,298

UNITED STATES PATENT OFFICE 2,276,298

SOLID AND LIQUID CONTACT APPARATUS

Charles H. Frazier, Cincinnati, Ohio, assignor to The Drackett Company, Cincinnati, Ohio, a corporation of Ohio Application April 18, 1939, Serial No. 268,647

9 Claims. (Cl. 23—270)

This invention relates to improvements in apparatus and methods for contacting solid and liquid materials and has for one of its objects the provision of a relatively simple and inexpensive system for ensuring intimate commingling of the liquid and the solid material, and for facilitating subsequent separation thereof.

More specifically, it is an object of the invention to provide an improved apparatus for treating solid material with a liquid, the apparatus comprising essentially a chamber in which adequate contact is effected, preferably by a continuous counter-flow method, and conveying means for removing solid material and entrained liquid from the chamber, the conveying means being constructed and arranged so as to facilitate drainage and suitable disposition of the entrained liquid. Preferably the solid material is removed from the lower portion of the chamber, and is elevated to a discharge point above the level of the liquid in the chamber, and drainage of entrained liquid from the solid material occurs while the latter is being thus elevated. Provision is also preferably made for the distribution of the material in a thin layer upon discharge from the conveying means, to further facilitate the separation of the liquid and solid constituents.

My invention is especially useful in effecting the removal of oil from vegetable material, such as soybean, peanut, and cottonseed meal, by means of a solvent for the oil, whereby oil and proteinaceous material may be separated for further treatment and use, and is so described herein. By the application of the principles of the invention to such a process I am enabled to secure efficient removal of the oily solution from the residue by the use of equipment which is both simple to construct and inexpensive to operate.

Further objects and features of the invention will be apparent from the following description taken in connection with the accompanying drawings in which:

Figure 1 is a side elevation, partly in section, of apparatus constructed in accordance with the invention;

Figure 2 is an enlarged vertical sectional view of a portion of the apparatus shown in Figure 1;

Figure 3 is a sectional view taken substantially on the line 3—3 of Figure 1;

Figures 4 and 5 are horizontal sectional views taken substantially on the lines 4—4 and 5—5 of Figure 2, respectively;

Figure 6 is an enlarged elevation, partly in section, of a portion of the structure shown in Figure 1;

Figure 7 is a plan view of a portion of the structure shown in Figure 6 with parts broken away;

Figures 8 and 9 are enlarged side and bottom views respectively of elements shown in Figure 2;

Figure 10 is an enlarged plan view of an element shown in Figure 2; and

Figure 11 is an enlarged side elevation, partly in section, of structure shown in Figure 1.

In order to facilitate an understanding of the invention and to simplify the description thereof, reference is made herein to the embodiment of the invention shown in the accompanying drawings, and specific language is employed in describing the same. It will nevertheless be understood that no limitation of the scope of the invention is thereby intended, various modifications and alterations of the illustrated structure and the described method being contemplated such as would fall within the province of one skilled in the art to effect.

Referring first to Figure 1 of the drawings, it will be observed that the principal elements of the apparatus are the contact chamber, illustrated in the form of a generally upright column 15, conveying means for removing solid material from the lower portion of the chamber and elevating the same, indicated generally at 16, and a further conveyor 17 for receiving the elevated material and continuing the separation of entrained liquid therefrom. Preferably the solid material is introduced through inlet means, indicated at 18, in the upper portion of the column 15, a screw conveyor 20 or the like being provided to feed the material thereto. The operation of the apparatus is continuous and involves the application of the well-known counter-flow principle, the downward movement of the solid material within the column 15 being retarded by suitable means, while the liquid flows upwardly through the column and is continuously withdrawn through an outlet 22 in the upper portion of the column. The supply of liquid to the system may be effected through either of two conduits 23 and 24 communicating respectively with the lower and upper ends of the conveying means 16, or otherwise arranged so that liquid is introduced into the column 15 adjacent the lower end of the latter.

It will be observed that the column 15 is generally cylindrical, having at its lower end a conical portion 26 leading to the discharge outlet 27, the axis of the column being disposed substantially vertically. A rotatable shaft 30, coaxial with the column and supported at its lower end in a thrust bearing 34 carries a plurality of vertically spaced screens 32, each of which is of circular outline and of a diameter approaching the internal diameter of the column, so that the downward movement of the solid material within the column is suitably retarded by passage through the successive screens. Immediately above each screen is supported one or more relatively fixed arms or rakes 33, two being employed in the structure shown in the drawing. Each of these rakes, as illustrated more particularly in Figures 8 and 9, is provided with a plurality of downwardly directed spaced fingers 35 formed integrally with a horizontally extending plate 36, the latter being secured to a circular plate 38 which is adapted to be bolted to a corresponding annular flange 39 extending exteriorly of the cylindrical column. Each of the flanges 39 is associated with an opening 37 in the column, through which the toothed portions of the rakes are introduced. The rakes 33 serve to ensure the continuous filtering of the solid material through the screens as the latter are rotated, and it will be appreciated that the method of mounting the rakes facilitates the removal of the same and such occasional cleaning of the screens as may be required, the screens being readily accessible through the openings 37. The shaft 30 is preferably rotated through gearing 29 from a motor 28 mounted at the upper end of the column.

As the solid material is delivered to the upper end of the column, it falls over a distributing plate 40, shown more particularly in Figure 4, which is formed to provide two sector-shaped arms. The material then passes through a screen 32 and thence successively through the remaining screens. Agitator arms 42 may be secured to the shaft 30 below the first screen 32 in order to avoid packing of the material at this point.

The material discharging through the outlet 27 at the lower end of the column falls into the upper passage 44 of the conveying means 16, adjacent the lower end of the latter. Thus it will be observed that the conveying means comprises two closed passages illustrated as substantially rectangular in outline, these passages being separate and distinct throughout the major portion of the length thereof. Within the conveying means, and movable in succession through the passages 44 and 45 is a propulsion device or drag conveyor of the continuous type, consisting of a chain or the like 48 on which are carried a multiplicity of blades or vanes 49, the latter extending transversely of and fitting snugly within the passages 44 and 45. The chain 48 passes, at its opposite ends, about guiding pulleys 51 and 52, the latter being driven by a motor 54 in a direction such that the chain 48 moves downwardly in the upper passage 44 and upwardly in the lower passage 45. It will be appreciated that solid material delivered to the upper passage 44 from the lower end of the column 15 is carried about the guide pulleys 51 and upwardly in the lower passage 45, and is discharged through the passage 55 into the conveyor 17. Since the conveying means 16 is in open communication with the lower end of the column 15, it is evident that liquid will rise in the conveying means to the level of the liquid in the column. It is a feature of the invention that the upper and lower passages of the conveying means are placed in communication at some point above this level, so that liquid entrained in the solid material may drain therefrom during the elevation of the material and be returned through the upper passage 44.

Thus it will be noted that the adjacent walls of the upper and lower passages 44 and 45 merge, as indicated at 56 into a common wall. This common wall is preferably perforated, as indicated more particularly in Figures 3 and 6, intermediate the points 58 and 59 in the length thereof, or is otherwise rendered pervious to liquid. The desired result is most conveniently achieved by the employment of a separate passage section 61 which is interposed between the upper and lower passage sections, the section 61 being constructed to provide a common perforated wall 62 separating the upper and lower passages 44 and 45.

It will be understood that as the solid material, containing the entrained treatment liquid, is carried upwardly through the passage 45, liquid will tend to drain out of that passage and into the passage 44 as the material passes the perforated plate 62, the separated liquid flowing downwardly in the passage 44, and the solid material, thus partially freed from liquid, continuing its upward movement to the discharge conduit 55. The separation of the solid from the liquid material is, of course, aided by the weight of the material, the liquid being, in effect, both expressed and drained from the material. The discharged material is thereby relieved of a considerable portion of its liquid content, and is much more readily and inexpensively dried for further treatment. Again, the construction affords a simple method of returning excess entrained liquid to the main body of liquid in the system. It may be noted that the wall 62 is inclined at an acute angle to the vertical, and that the passage through which the material is moved lies beneath this wall. Thus the solid particles do not tend to pass through the wall perforations, even though the perforations are quite large to facilitate drainage of liquid therethrough.

On discharge through the conduit 55, the material is delivered onto the conveyor 17, shown more particularly in Figures 6 and 7 of the drawings, and conveniently referred to as a rotary conveyor. This conveyor is illustrated as comprising essentially a generally annular housing 65 into which the material is received, the housing being open at its upper side and having the bottom plate 66 thereof perforated. A plurality of U-shaped conveying arms 68, conforming substantially to the internal dimensions of the housing 65 and received therein are mounted on a supporting plate 69 secured to and rotatable with a driving shaft 70. The shaft 70 is driven by bevel gearing 71, 72 from a suitable source of motive power so as to cause the conveying arms to sweep the material about the annular chamber 65, whereby additional entrained liquid may filter through the perforations in the bottom plate 66 and be discharged downwardly into a hopper 74 communicating through a conduit 75 with the upper passage 44 of the conveying means, and thus returned to the main body of liquid in the system. Solid material is discharged downwardly through an opening 77 in the bottom plate 66 and may be conveyed through a conduit 78 to any convenient point for such further treatment as may be desired.

In the use of the apparatus shown herein for the extraction of oil from vegetable material, and particularly from proteinaceous material such as soy bean and the like, the efficiency of the apparatus can be considerably improved by preliminary treatment. Thus in the case of soy bean, the foreign matter is removed, the beans are cracked or partially crushed, and preferably flaked by passage through conventional flaking rolls. The bean flakes are then delivered to the top of the extraction column 15 while a solvent for the oil, such as hexane derived from gasoline, is caused to flow upwardly in the column as hereinbefore described. The process is preferably continuous, provision being made to recover the oil from the discharged solvent and to recirculate the latter.

It will be appreciated, however, that the processing details form no part of the instant invention, which is concerned primarily with apparatus adapted to a multitude of uses involving the treatment of solid material with a liquid.

Preferably the speed of rotation of the conveying arm 68 is so adjusted that the material is swept about the trough at a linear speed which is greater than the linear speed of the conveying means 16, so that the material is received on the bottom of the trough in a relatively thin layer and is not permitted to build up to a substantial depth, whereby liquid may be more readily drained from the solid material.

Having thus described the invention, what is claimed as new and desired to be secured by Letters Patent is:

1. In apparatus for treating a solid material with a liquid, the combination with a generally upright column having in the upper portion an inlet for solid material, means within said column for retarding downward movement of said material therein, means for causing liquid to circulate in said column, conveying means constructed and arranged to remove said material from the lower portion of the column and elevate the same to a discharge point higher than the level of liquid in the column, and liquid pervious conveying means constructed and arranged to drain the liquid from the solid material conveyed thereby, said conveying means being driven at a higher linear speed than said first conveying means and receiving the said material from the latter in a relatively thin layer to facilitate removal of liquid therefrom.

2. In apparatus for treating a solid material with a liquid, the combination with a generally upright column having in the upper portion an inlet for solid material, means for establishing retarded downward movement of said material within said column, means for causing liquid to circulate in said column, conveying means for removing said material from the lower portion of the column and elevating the same to a discharge point higher than the level of liquid in the column, and a conveyor comprising an annular, liquid pervious support for the material and rotary means for propelling the material along said support, said propelling means being driven at a higher linear speed than said conveying means for receiving the said material from said conveying means and forwarding the same in a relatively thin layer to facilitate drainage of liquid therefrom.

3. In apparatus for treating a solid material with a liquid, the combination with a generally upright column having in the upper portion an inlet for solid material, means for establishing retarded downward movement of said material within said column, means for causing liquid to circulate in said column, conveying means for removing said material from the lower portion of the column and elevating the same to a discharge point higher than the level of liquid in the column, said conveying means comprising an upwardly directed passage, and means for moving the said material upwardly in said passage, a portion of said passage disposed above the level of the liquid in said column extending in a direction inclined at an acute angle to the vertical, the lower side of said portion of said passage being impervious to liquid and the upper side of said portion of said passage being perforated to permit expression and drainage of entrained liquid from said material and means for collecting the liquid so expressed and drained.

4. In apparatus for treating a solid material with a liquid, the combination with a generally upright column having in the upper portion an inlet for solid material, means for establishing retarded downward movement of said material within said column, means for causing liquid to circulate in said column, conveying means for removing said material from the lower portion of the column and elevating the same to a discharge point higher than the level of liquid in the column, said conveying means comprising an upwardly directed passage through which said material is moved, a return passage, and endless propulsion means moving in said passages, said first named passage having a liquid pervious wall above the level of the liquid in said column through which liquid entrained in said material may drain.

5. In apparatus for treating a solid material with a liquid, the combination with a generally upright column having in the upper portion an inlet for solid material, means for establishing retarded downward movement of said material within said column, means for causing liquid to circulate in said column, conveying means for removing said material from the lower portion of the column and elevating the same to a discharge point higher than the level of liquid in the column, said conveying means comprising an upwardly directed passage through which said material is moved, a return passage, and endless propulsion means moving in said passages, a portion of said passages disposed above the level of the liquid in said column having a common perforated wall extending in a direction inclined at an acute angle to the vertical and defining the upper wall of said first named passage, whereby entrained liquid may drain from said material into said return passage.

6. In apparatus for treating a solid material with a liquid, the combination with a generally upright column having in the upper portion an inlet for solid material, means for establishing retarded downward movement of said material within said column, means for causing liquid to circulate in said column, conveying means for removing said material from the lower portion of the column and elevating the same to a discharge point higher than the level of liquid in the column, a perforated support receiving the material discharged from said conveying means, and means propelling said material along said support at a linear speed greater than that of said conveying means.

7. In a method of treating solid pulverulent material with a liquid, the steps which comprise causing the solid material and the liquid to circulate in opposite directions in intimate and prolonged contact, elevating the solid material and entrained liquid in a closed passage inclined at an acute angle to the vertical to a point above the level of the liquid, expressing and draining excess entrained liquid from the upper surface only of the solid material while continuing the elevation of the latter, and returning the drained liquid to the liquid being circulated.

8. In conveying means for solid material having liquid entrained therein, the combination with a passage extending at an acute angle to the vertical, of propulsion means comprising a continuous drag conveyor for engaging and moving the said material upwardly in said passage, said passage having an imperforate wall beneath the material to support the latter and a liquid pervious wall disposed above the material, whereby liquid may be expressed and may drain from said material through said liquid pervious wall and means for collecting the liquid so expressed and drained.

9. In apparatus for treating a solid material with a liquid, the combination with an extraction chamber in which liquid is caused to circulate in contact with the solid material, of conveying means for removing said material from said chamber and elevating the same to a discharge point higher than the level of liquid in the chamber, an annular trough receiving the material from said conveying means, said trough having stationary side and bottom walls, said bottom wall being pervious to liquid and having an outlet for said material therein, of rotary means extending within said trough and conforming substantially to the internal dimensions thereof for sweeping said material about said trough and toward said outlet, the width of said trough being small as compared to the radius of the inner wall thereof.

CHARLES H. FRAZIER.